United States Patent
Gutman

(12) 
(10) Patent No.: US 6,727,427 B1
(45) Date of Patent: Apr. 27, 2004

(54) ELECTRICAL WIRING CHANNEL

(76) Inventor: Bruce Gutman, 10703 Durland Ave. NE., Seattle, WA (US) 98125

( * ) Notice: Subject to any disclaimer, the term of this patent is extended or adjusted under 35 U.S.C. 154(b) by 0 days.

(21) Appl. No.: 10/385,541

(22) Filed: Mar. 12, 2003

(51) Int. Cl.[7] .............................. H02G 3/04
(52) U.S. Cl. ................ 174/48; 174/50; 174/68.1; 174/70 C; 52/220.7
(58) Field of Search ............. 174/48, 50, 68.1, 174/70 C, 72 A, 72 R, 97; 220/4.02; 248/205.1, 74.3; 52/220.1, 220.7

(56) References Cited

U.S. PATENT DOCUMENTS

| | | | |
|---|---|---|---|
| 3,262,083 A | * | 7/1966 | Gooding ............... 439/216 |
| 3,622,686 A | * | 11/1971 | Neirinck et al. ............. 174/97 |
| 3,721,762 A | * | 3/1973 | Gooding ............... 174/48 |
| 3,761,603 A | | 9/1973 | Hays et al. |
| 3,786,171 A | | 1/1974 | Shira |
| 4,423,284 A | | 12/1983 | Kaplan |
| 4,800,695 A | | 1/1989 | Manchetti |
| 5,336,849 A | | 8/1994 | Whitney |
| 6,084,180 A | | 7/2000 | DeBartolo, Jr. et al. |
| 6,173,542 B1 | | 1/2001 | Wright |
| 6,323,421 B1 | | 11/2001 | Pawson et al. |
| 6,348,660 B1 | | 2/2002 | Gutgsell et al. |
| 6,484,360 B1 | | 11/2002 | DeBartolo, Jr. et al. |
| 6,504,098 B2 | | 1/2003 | Seamans |

FOREIGN PATENT DOCUMENTS

EP  0 592 248 A1  4/1994

* cited by examiner

Primary Examiner—Dhiru R. Patel
(74) Attorney, Agent, or Firm—Michael J. Foycik, Jr.

(57) ABSTRACT

An electrical wiring channel is installed beneath a wallboard, and includes a wiring channel member, a wiring faceplate, and a baseboard. The electrical wiring channel can be retrofit into existing buildings, by removing existing molding, and removing a portion of the wallboard below level of the molding to leave a gap or recess within which the wiring channel member can be inserted. The wiring channel member is C-shaped and has a female fastener member with a bore therein for receiving a male fastener member of the wiring faceplate. A new baseboard can be adhered to the wiring faceplate. Additional variations can include a right-angled channel portion for use with interior wall corners, exterior wall corners, or with door frames.

6 Claims, 8 Drawing Sheets

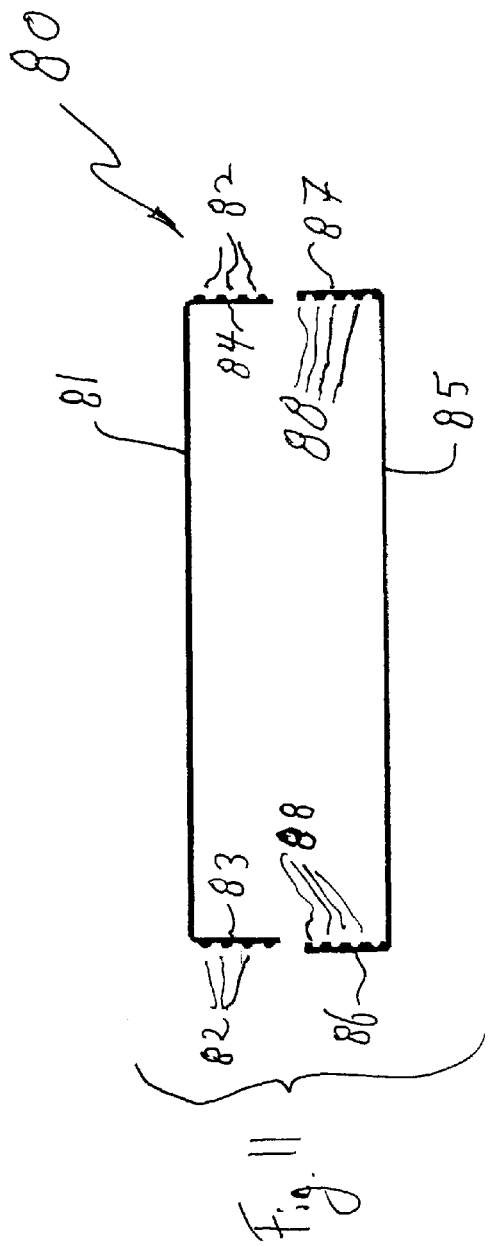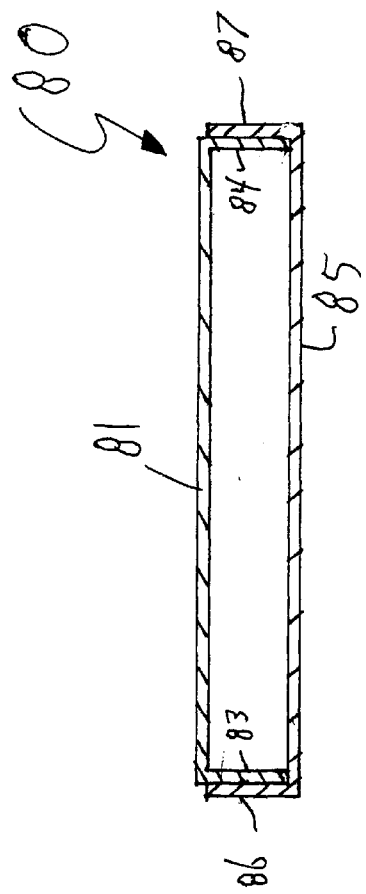

ELECTRICAL WIRING CHANNEL

FIELD OF THE INVENTION

The present invention relates to an electrical wiring channel which can be installed in existing buildings.

BACKGROUND OF THE INVENTION

At the pace of technological change, today's existing buildings cannot always keep up. When a new technology emerges that requires a new type of wiring, it poses significant challenges to residences and businesses.

New office buildings are better designed to accommodate wiring changes. They have hollow ceilings, cubicles with built-in wiring channels, specialized racks within wiring closets, and so on.

Residences and businesses that are in older buildings have many more challenges. When a building is first built, much of the wiring for the technologies of the day is run through the walls. Over time, technology changes and much of the wiring becomes obsolete.

There are many solutions that attempt to address this issue, but most of them do not work very well. Some of these are discussed below.

Surface mount wiring channels are known, and are typically metal or plastic channels which are mounted to a wall. Generally, these are very noticeable and unattractive.

Additionally, surface mount wiring is known. Such wiring is in the form of flattened wires that can be stapled or adhered to a wall. These are, for example, sometimes used for speaker wires. These are moderately noticeable, and can be relatively expensive.

Wireless technologies are known, which dispense with wires altogether. Some of these work well in an existing building, while others may not. Expense is also a factor, as these applications can require newer technologies that are more expensive than conventional wiring. Further, it can be difficult to find a location for a wireless access point.

It is, however, a problem in the art to provide an electrical wiring system which can be installed in existing buildings, which is relatively inexpensive and attractive.

SUMMARY OF THE INVENTION

From the foregoing, it is seen that it is a problem in the art to provide a device meeting the above requirements. According to the present invention, a device and process are provided which meets the aforementioned requirements and needs in the prior art. Specifically, the device according to the present invention provides an electrical wiring channel which can be installed easily in existing buildings.

More particularly, the invention relates to an electrical wiring channel having a C-shaped portion which can be installed at the level of a baseboard molding, and a faceplate carrying a baseboard molding. The invention can include specially-shaped wiring channel portions shaped for corners, so as to go around the periphery of door frames and around corners of walls.

The wiring channel portions have female fastener members. The faceplate members have male fastener members which can engage with the female fastener members to retain the faceplates in position. The baseboard can be fastened in any known manner to the faceplates.

The wiring channel with removable faceplate runs parallel to and in plane with the wallboard. When the baseboard molding is attached to the removable faceplate, they become an integrated unit that is attractive and hides the wiring from view.

While the present invention is intended for installation in existing buildings, it is contemplated as being within the scope of the present invention to install it in new buildings.

Other objects and advantages of the present invention will be more readily apparent from the following detailed description when read in conjunction with the accompanying drawings.

BRIEF DESCRIPTION OF THE DRAWINGS

FIG. 11 is a schematic side view of a further embodiment of the present invention, wherein two opposed members having interengageable teeth are joined together.

FIG. 12 is a sectional view of the embodiment of FIG. 11, showing the two opposed members in an engaged position.

DETAILED DESCRIPTION OF THE INVENTION

Figure 1:
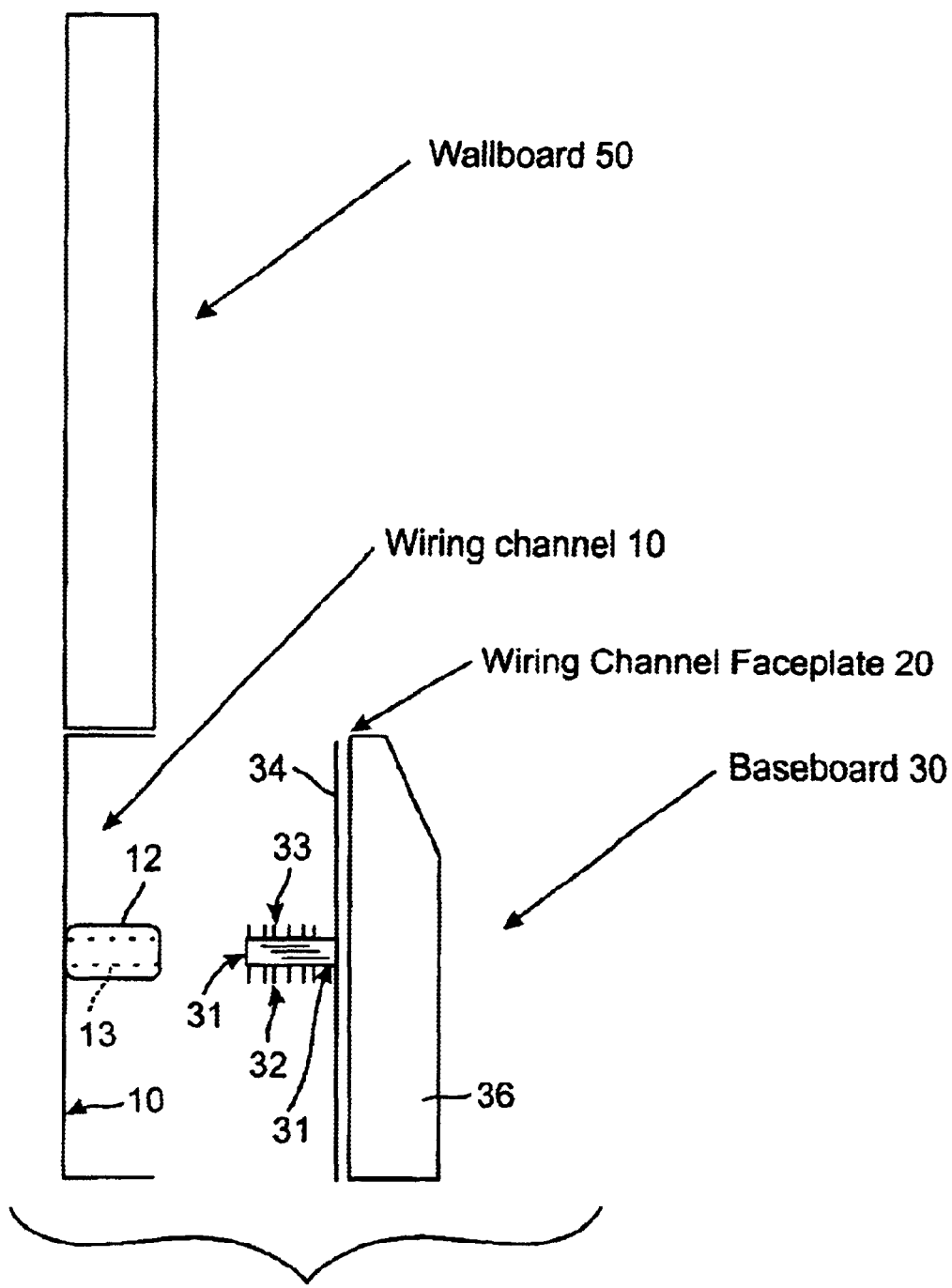
FIG. 1 is a schematic side view of an electrical wiring channel according to the present invention being installed in a wall.

An electrical wiring channel is shown in FIG. 1 installed beneath a wallboard 50. The electrical wiring channel includes a wiring channel member 10, a wiring faceplate 20, and a baseboard 30. An important feature of the present invention is that the wiring channel runs in plane with wallboard, sheet rock, or drywall. This creates an attractive, neat appearance.

The electrical wiring channel of the present invention can be retrofit into existing buildings, by performing the following steps. First, existing molding is removed. Then, at the level of the molding, a one half inch deep cut is made into the wallboard, so that the lowermost portion of wallboard can be removed. This will leave a gap or recess within which the wiring channel member 10 can be inserted.

The wiring channel member 10 is C-shaped and has a female fastener member 12 with a bore 13 therein for receiving a male fastener member 32 of the wiring faceplate 20. The baseboard 30 has a baseboard body 36 which can be adhered to the wiring faceplate 20 using glue or adhesive, or can be attached by other known means.

As seen in FIG. 1, the male fastener member 32 of the wiring faceplate 20 has male fastener stem portion 31 and a male fastener resilient fin portion 33.

Figure 2:
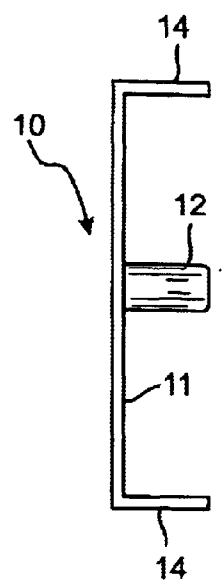
FIG. 2 is a side elevational view of a wiring channel member used in the electrical wiring channel of FIG. 1, according to the present invention.

As seen in FIG. 2, the wiring channel member 10 of FIG. 1 is shown in side elevational view. In this view, there is seen a channel wall portion 11 connecting two opposed wiring channel sidewalls 14, 14. The female fastener member 12 projects from the channel wall portion 11.

Figure 3:
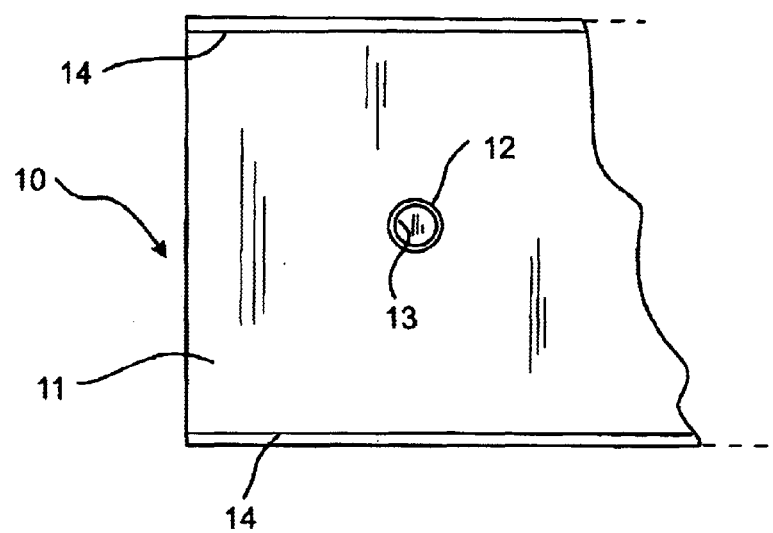
FIG. 3 is a front elevational view of the wiring channel member of FIG. 2.

FIG. 3 is a front elevational view of the wiring channel member 10 of FIG. 2. In this view, the location of the female fastener member 12 and the interior passage 13 is clearly visible. The channel wall portion 11 is planar. In this figure, the right hand portion of the wiring channel member 10 is broken away. The length of the wiring channel member 10 can be chosen from standard or custom lengths, and can be cut to a smaller length for specific purposes.

Figure 4:
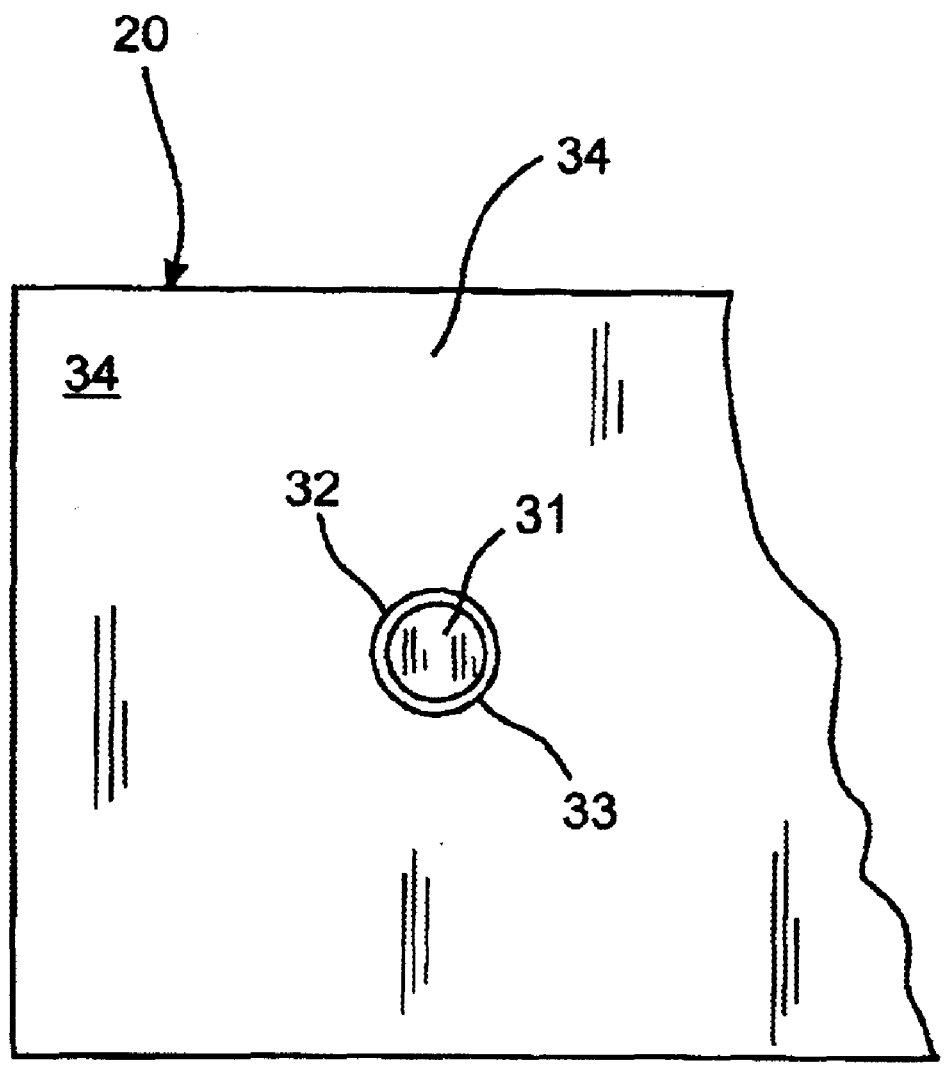
FIG. 4 is a front elevational view of a wiring faceplate used in the electrical wiring channel of FIG. 1, according to the present invention.

FIG. 4 is a front elevational view of the wiring faceplate 20 used in the electrical wiring channel of FIG. 1. The wiring faceplate 20 has a faceplate member 34, and the male fastener member 32 projects from the faceplate member 34. As noted above, the male fastener member 32 has a male fastener stem portion 31 and a male fastener resilient fin portion 33. While a specific type of fastener member 32 is shown, it will be understood that other types of fastener member are contemplated as being within the scope of the present invention. For example, threaded fastener members such as screws or bolts can be used, or magnetic fastener elements can be used, among other known types of fastener. Also, it will be understood that the male and female fastener members can be interchanged in the present invention, so that it is the wiring faceplate 20 which carries the female fastener member, for example.

Figures 5, 6, 7:
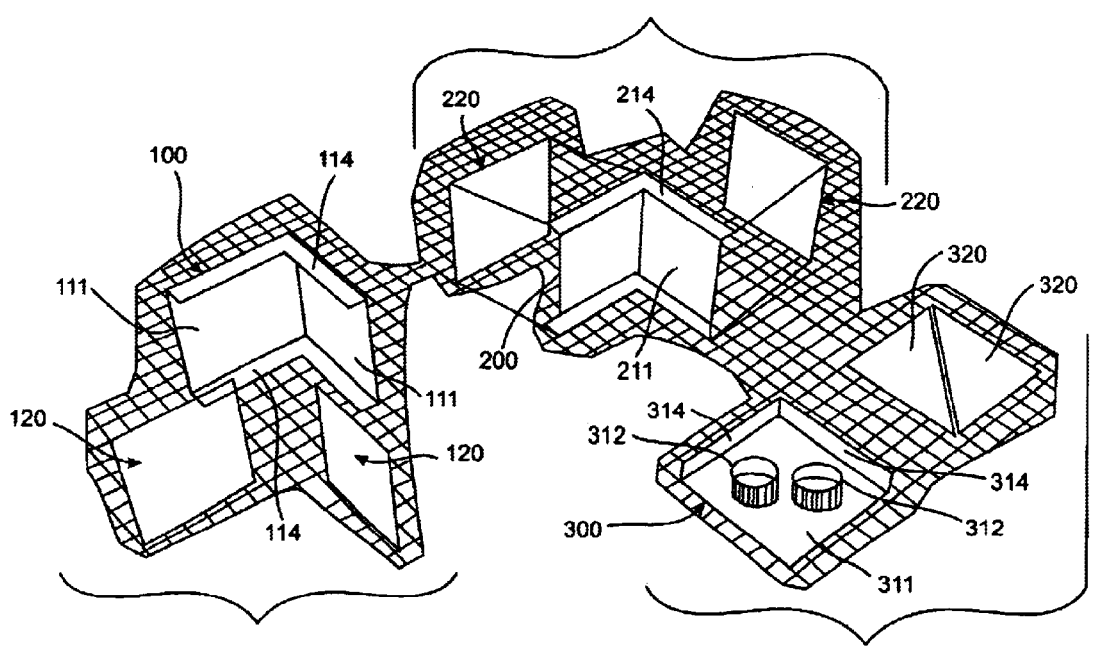
FIG. 5 is a perspective view of a second embodiment of a wiring channel member, for use with interior corners of rooms.
FIG. 6 is a perspective view of a third embodiment of a wiring channel member, for use with exterior corners of rooms.
FIG. 7 is a perspective view of a fourth embodiment of a wiring channel member, for use as outermost corners of a wiring channel formed around a passageway such as a door frame.

FIG. 5 is a perspective view of a second embodiment of a wiring channel member, for use with interior wall corners or with door frames. In this view, a wiring channel member 100 is shown shaped as a ninety-degree corner element. The wiring channel member 100 has a pair of opposed wiring channel sidewalls 114, 114 connected by a channel wall portion 111. In this embodiment, however, it will take two separate wiring faceplate members 120, 120 to cover the channels. The male and female fastener members are omitted from this view for the sake of clarity.

FIG. 6 is a perspective view of a third embodiment of a wiring channel member, for s use with exterior corners of walls. In this view, a wiring channel member 200 is shown shaped as a ninety-degree corner element. The wiring channel member 200 has a pair of opposed wiring channel sidewalls 214, 214 connected by a channel wall portion 211. In this embodiment, however, it will take two separate wiring faceplate members 220 to cover the channels. The male and female fastener members are omitted from this view for the sake of clarity.

FIG. 7 is a perspective view of a fourth embodiment of a wiring channel member, for use as outermost corners of a wiring channel formed around a passageway such as a door frame. In this view, a wiring channel member 300 is shown shaped as a square member corner element. The wiring channel member 300 has a pair of opposed wiring channel sidewalls 314, 314 connected by a channel wall portion 311. In this embodiment, however, it will take two separate wiring faceplate members 320, 320 to cover the square member. Two female fastener members 312, 312 are shown in this view, and engage with respective male fastener elements (not shown) on the faceplate members 320, 320.

Figure 8:
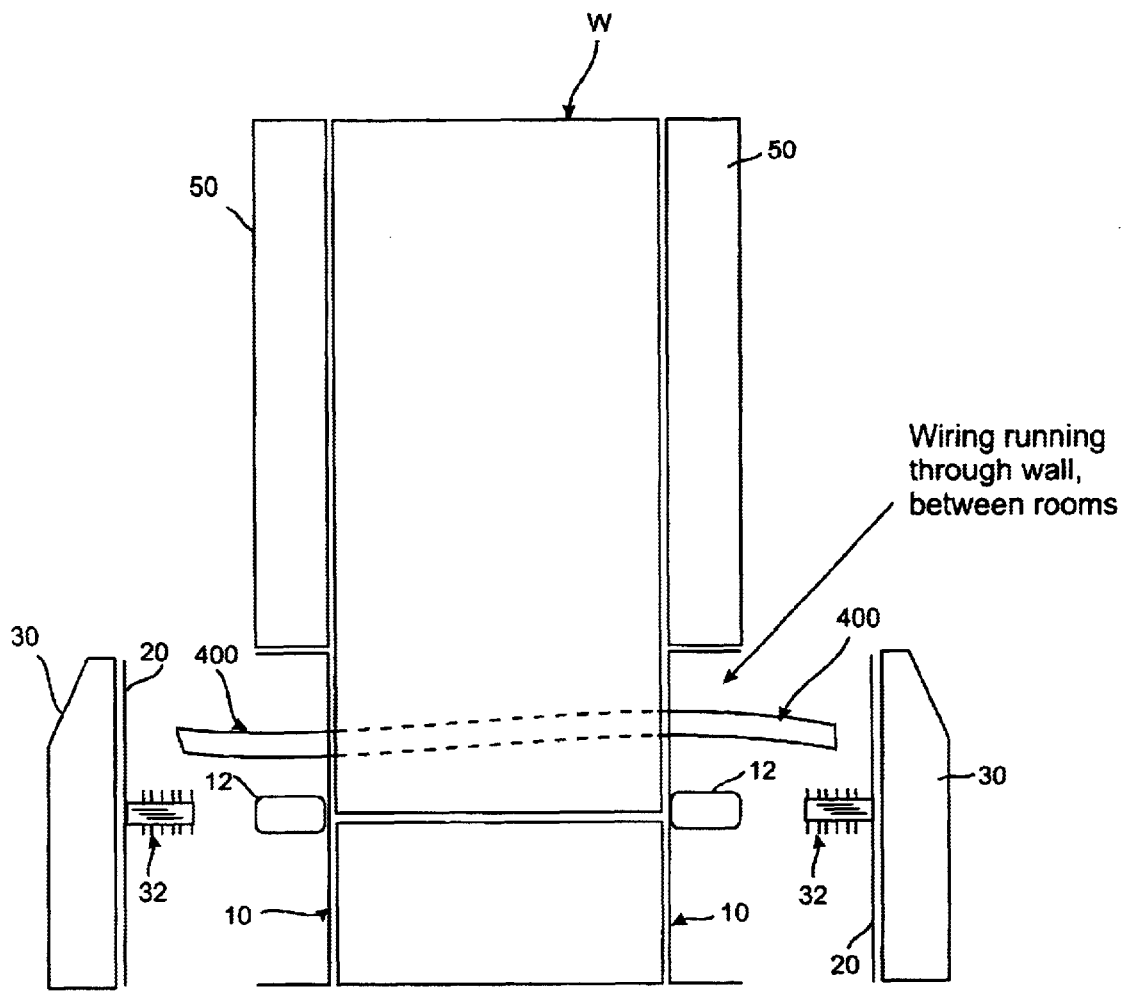
FIG. 8 is a schematic side view of two electrical wiring channels installed on opposite ides of a wall, with an electrical wire running between them and through the wall.

FIG. 8 is a schematic side view of two electrical wiring channels installed on opposite sides of a wall W, with an electrical wire 400 running between them and through the wall.

Figure 9:
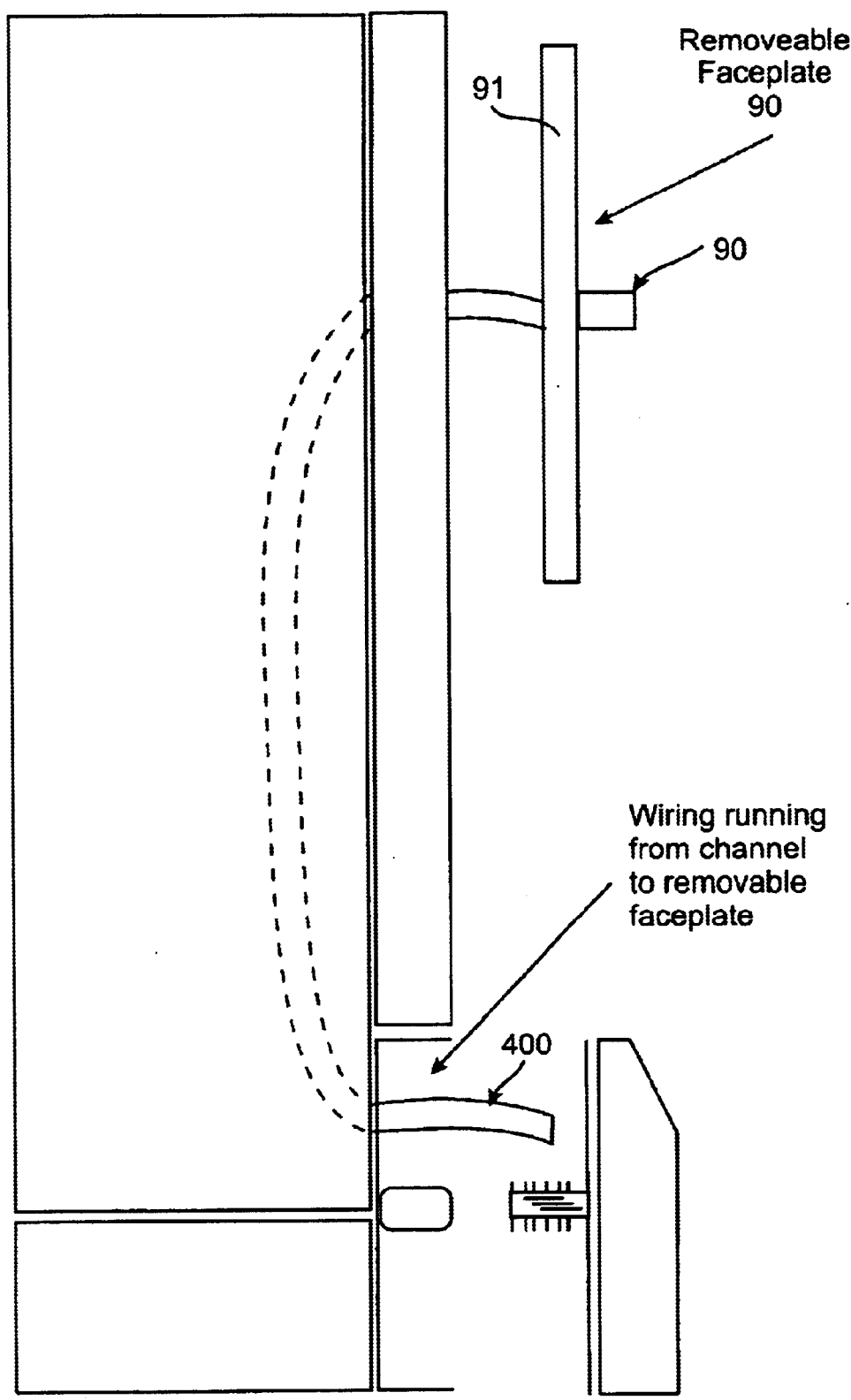
FIG. 9 is a schematic side view of an electrical wiring channel being installed in a wall together with a removable faceplate of a wiring interface.

FIG. 9 is a schematic side view of an electrical wiring channel as in FIG. 1 installed in a wall, together with a removable faceplate 91 of a wiring interface 90. A wire 400 is shown running to the wiring interface 90. The wiring interface 90 can be any typical wiring interface for the specific wiring used. For example, for optical fiber wiring, the wiring interface 90 would be an optical interface. For coaxial cable wiring, the wiring interface 90 would be a coaxial cable interface. Other examples would include any other standard or known types of wiring interface elements, known in the wiring and connector arts.

Figure 10:
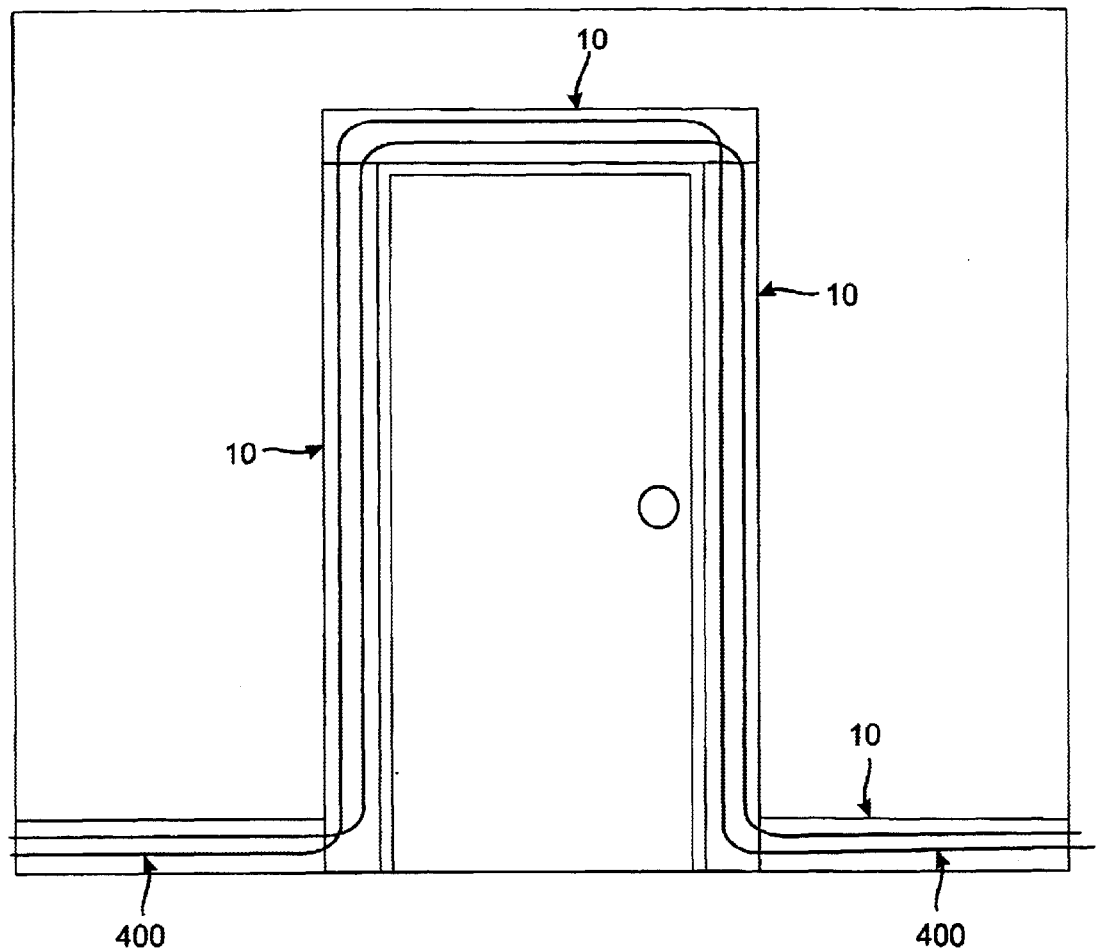
FIG. 10 is a schematic front view of an electrical wiring channel installed around a door frame, with the route of the wires being shown schematically.

FIG. 10 is a schematic front view of an electrical wiring channel installed around a door frame, with the route of the wires being shown schematically.

FIG. 11 is a schematic side view of a further embodiment of the present invention, wherein a wiring channel member 80 is formed by two opposed members 81 and 85. The members 81 and 85 are interengageable, due to respective teeth members 82, 88. Specifically, the member 81 has opposed sidewalls 83 and 84. Teeth 82 are formed are outer sides of the sidewalls 83 and 84. Similarly, the member 85 has opposed sidewalls 86 and 87. Teeth 88 are formed on interior sides of the sidewalls 86 and 87. The teeth 82 and teeth 88 are preferably sized such that gaps between teeth 82 correspond generally to the widths of the teeth 88, so that the teeth 82 and 88 can interengage with each other in an assembled condition of the wiring channel member 80.

FIG. 12 is a sectional view of the embodiment of FIG. 11, showing the two opposed members 81 and 85 in the engaged position, forming the assembled wiring channel member 80.

An advantage of the embodiment of FIGS. 11 and 12, is that the members 81 and 85 can be formed by extrusion. In assembling the members 81 and 85 to form the assembled wiring channel member 80, the member 81 is urged into the member 85 such that the walls 86, 87 deform slightly outwardly, while the walls 83, 84 are deformed slightly inwardly. In the assembled condition, the teeth 82 are engaged with the teeth 88.

In a preferred embodiment, the channel members 81 and 85 extend about 90 mm between their respective sidewalls, each sidewall is about 11.5 mm long, and the walls are uniformly about 1.5 mm in thickness.

The invention being thus described, it will be evident that the same may be varied in many ways. Such variations are not to be regarded as a departure from the spirit and scope of the invention and all such modifications are intended to be included within the scope of the claims.

What is claimed is:

1. An electrical wiring channel for installation in an existing building that runs in plane with wallboard, sheet rock, or drywall, comprising:
   a wiring channel member having a female fastener member, and
   a wiring faceplate connectable to said wiring channel member; wherein said wiring faceplate is adapted for carrying a baseboard member;
   wherein said wiring faceplate further comprises a male fastener member which is engageable with said female fastener member of said wiring channel member.

2. An electrical wiring channel as claimed in claim 1, wherein said wiring faceplate has a substantially flat body portion.

3. An electrical wiring channel as claimed in claim 1, wherein said wiring channel member has C shape formed by a planar channel wall portion and wiring channel sidewalls extending at right angles from said planar channel wall portion.

4. An electrical wiring channel as claimed in claim 1, wherein said wiring channel member has a C shape formed by a planar channel wall portion and wiring channel sidewalls extending at right angles from said planar channel wall portion; and further comprising a wiring interface for connection of a wire running with the channel.

5. An electrical wiring channel kit for installation in an existing building, comprising:

a plurality of wiring channel members, a plurality of wiring faceplates connectable to said wiring channel members, a plurality of baseboard members attachable to the wiring faceplate, and a projecting fastener element;

wherein said wiring faceplate further comprises fastener member which is engageable with said projecting fastener element of said wiring channel member.

6. An electrical wiring channel, comprising:

a first channel member having a C-shaped body including two opposed sidewalls; and a plurality of teeth disposed on an exterior side each of said two opposed sidewalls of the first channel member;

a second channel member having a C-shaped body including two opposed sidewalls; and a plurality of teeth disposed on an interior side each of said two opposed sidewalls of the second channel member;

wherein said plurality of teeth of said first channel member are interengageable with said plurality of teeth of said second channel member when said first channel member is urged toward said second channel member, such that said first channel member is secured within said second channel member.

* * * * *